United States Patent
Jüchems et al.

(10) Patent No.: US 12,488,785 B2
(45) Date of Patent: Dec. 2, 2025

(54) DIALOGUE SYSTEMS

(71) Applicant: Limbic Limited, London (GB)

(72) Inventors: Keno Onno Jüchems, Oxford (GB); Max Rollwage, Chelmsford (GB); Ross Edward Francis Harper, London (GB); Tobias Ueli Hauser, Tübingen (DE); Sebastiaan de Vries, Amsterdam (NL); Omar Samir Mohammed El-Shahat Mohammed, Toulouse (FR)

(73) Assignee: Limbic Limited, London (GB)

( * ) Notice: Subject to any disclaimer, the term of this patent is extended or adjusted under 35 U.S.C. 154(b) by 368 days.

(21) Appl. No.: 18/345,135

(22) Filed: Jun. 30, 2023

(65) Prior Publication Data

US 2025/0006181 A1   Jan. 2, 2025

(51) Int. Cl.
*G10L 15/06*   (2013.01)
*G10L 15/22*   (2006.01)

(52) U.S. Cl.
CPC ............ *G10L 15/063* (2013.01); *G10L 15/22* (2013.01); *G10L 2015/0631* (2013.01)

(58) Field of Classification Search
CPC ................... G10L 15/063; G10L 15/22; G10L 2015/0631
See application file for complete search history.

(56) References Cited

U.S. PATENT DOCUMENTS

| | | | |
|---|---|---|---|
| 6,266,664 B1 * | 7/2001 | Russell-Falla | G06F 16/9535 |
| | | | 707/999.005 |
| 6,665,640 B1 * | 12/2003 | Bennett | G09B 5/04 |
| | | | 704/E15.04 |

(Continued)

FOREIGN PATENT DOCUMENTS

| | | | | | |
|---|---|---|---|---|---|
| WO | WO-2004034378 A1 | * | 4/2004 | ............ | G06F 40/216 |
| WO | WO-2011016129 A1 | * | 2/2011 | ............ | G10L 15/32 |
| WO | WO-2011052412 A1 | * | 5/2011 | ............ | G10L 15/30 |
| WO | WO-2013157603 A1 | * | 10/2013 | ............ | G06F 16/955 |

(Continued)

*Primary Examiner* — Mohammad K Islam
(74) *Attorney, Agent, or Firm* — Pillsbury Winthrop Shaw Pittman LLP

(57) ABSTRACT

Described herein there is a computer-implemented method for generating a dialogue system output, comprising: receiving, at an input, input data relating to a speech or text input signal originating from a user device; receiving, at one or more processors, a plurality of domain snippets, wherein each domain snippet comprises data representing reference data and data representing an associated prompt; processing, by the one or more processors, the plurality of domain snippets to determine a plurality of similarity indicators, each similarity indicator indicating a similarity between the input data and a respective domain snippet; processing, by the one or more processors, the plurality of similarity indicators to select one or more of the data representing reference data; providing, by the one or more processors, data representing the input data and the one or more data representing reference data as an input to an input layer of a neural network configured to generate a dialogue system output by: identifying at least a portion of reference data of the one or more data representing reference data for use by at least one layer of the neural network to generate a response to the input data; processing the portion of reference data to generate a dialogue system output; and outputting, by an output layer of the neural network, the dialogue system output; and outputting, by an output of a dialogue system, the dialogue system output.

11 Claims, 9 Drawing Sheets

(56) References Cited

U.S. PATENT DOCUMENTS

| | | | | |
|---|---|---|---|---|
| 8,447,602 | B2* | 5/2013 | Bartosik | G06F 40/232 |
| | | | | 704/235 |
| 9,064,493 | B2* | 6/2015 | Ganong, III | G10L 15/1815 |
| 9,619,735 | B1* | 4/2017 | Lineback | G06N 3/08 |
| 10,360,265 | B1* | 7/2019 | Agarwal | G10L 15/1815 |
| 10,565,498 | B1* | 2/2020 | Zhiyanov | G06N 3/045 |
| 10,573,312 | B1* | 2/2020 | Thomson | G10L 15/22 |
| 10,853,579 | B2* | 12/2020 | Laxman | G06F 40/30 |
| 10,878,174 | B1* | 12/2020 | Vontobel | G06Q 10/06398 |
| 11,031,001 | B1* | 6/2021 | Cheng | G06N 5/02 |
| 11,106,690 | B1* | 8/2021 | Dhillon | G06N 5/01 |
| 11,437,027 | B1* | 9/2022 | Guo | G06F 40/30 |
| 11,481,434 | B1* | 10/2022 | Venti | G06F 40/30 |
| 11,482,223 | B2* | 10/2022 | Dua | G06F 40/20 |
| 11,532,301 | B1* | 12/2022 | Hajebi | G06F 40/35 |
| 2003/0115191 | A1* | 6/2003 | Copperman | G06F 16/90332 |
| | | | | 707/E17.139 |
| 2009/0234650 | A1* | 9/2009 | Yano | G10L 15/22 |
| | | | | 704/E15.005 |
| 2012/0215776 | A1* | 8/2012 | Guha | G06F 16/951 |
| | | | | 707/E17.064 |
| 2015/0248883 | A1* | 9/2015 | Ganong, III | G10L 15/1815 |
| | | | | 704/251 |
| 2015/0278341 | A1* | 10/2015 | Shen | G06F 16/9538 |
| | | | | 707/730 |
| 2016/0323398 | A1* | 11/2016 | Guo | H04L 67/535 |
| 2017/0127016 | A1* | 5/2017 | Yu | G06N 3/084 |
| 2017/0323636 | A1* | 11/2017 | Xiao | G06N 3/044 |
| 2018/0077101 | A1* | 3/2018 | Desouza Sana | G06Q 10/107 |
| 2019/0035397 | A1* | 1/2019 | Reily | G06F 16/632 |
| 2019/0043476 | A1* | 2/2019 | Hofer | G10L 25/87 |
| 2019/0057683 | A1* | 2/2019 | Sak | G10L 15/22 |
| 2019/0108228 | A1* | 4/2019 | Zeng | G06F 16/24522 |
| 2020/0097598 | A1* | 3/2020 | Anderson | G06F 18/23213 |
| 2020/0118544 | A1* | 4/2020 | Lee | G10L 15/063 |
| 2020/0184959 | A1* | 6/2020 | Yasa | G10L 15/1815 |
| 2020/0356653 | A1* | 11/2020 | Cho | G06N 3/084 |
| 2021/0042136 | A1* | 2/2021 | Zhu | G06N 3/08 |
| 2021/0192134 | A1* | 6/2021 | Yue | G06F 3/04895 |
| 2021/0201351 | A1* | 7/2021 | Nag | G06F 16/24534 |
| 2021/0248136 | A1* | 8/2021 | Panuganty | G06F 16/972 |
| 2021/0280180 | A1* | 9/2021 | Skobeltsyn | G06F 16/3325 |
| 2021/0358499 | A1* | 11/2021 | Lefkofsky | G06F 3/0481 |
| 2021/0375272 | A1* | 12/2021 | Madwed | G06F 3/167 |
| 2021/0400235 | A1* | 12/2021 | Kamisetty | H04L 65/1069 |
| 2022/0012076 | A1* | 1/2022 | Natarajan | H04W 12/08 |
| 2022/0366901 | A1* | 11/2022 | Rathaur | G06F 16/245 |
| 2023/0134791 | A1* | 5/2023 | Londeree | G06F 16/93 |
| | | | | 706/50 |
| 2025/0086213 | A1* | 3/2025 | Dilipkumar | G06F 16/24522 |
| 2025/0238433 | A1* | 7/2025 | Sussman | G06Q 10/10 |

FOREIGN PATENT DOCUMENTS

| | | | | |
|---|---|---|---|---|
| WO | WO-2017112813 | A1* | 6/2017 | G06F 40/30 |
| WO | WO-2018047421 | A1* | 3/2018 | G10L 15/02 |
| WO | WO-2020044755 | A1* | 3/2020 | G10L 15/32 |
| WO | WO-2021144901 | A1* | 7/2021 | G10L 15/02 |
| WO | WO-2023017320 | A1* | 2/2023 | G10L 15/22 |

\* cited by examiner

DIALOGUE SYSTEMS

FIELD

The present application relates to a computer-implemented method and systems for generating a dialogue system output.

BACKGROUND

Language models are typically trained to generate an output based on an input. For example, a language model may be trained to receive an incomplete sentence as an input and to predict a next word in a sentence. Training of a language model is usually carried out using a large corpus of training data, for example, text from Wikipedia. Such training allows the language model to learn relationships between words without learning any specific knowledge of a topic. The training thus allows the language model to predict a next word in the sentence and provide grammatically correct sentences as output.

While the language model may provide an output (i.e. an answer to the query) that is grammatically correct, the answer may be entirely false. In other words, language models can provide information that may appear plausible to a user, particular an uninformed user, that is nonetheless incorrect. For example, an input to a language model could be a query asking where a famous person was born and the language model may provide an incorrect location in a grammatically correct sentence in response. As an alternative example, an input to a language model could be a query asking who won a particular sporting event and the language model may provide an incorrect person in a grammatically correct sentence in response. Accordingly, due to a potential of information provided by the language model of being false, such models are not appropriate for use where the output is required to be factual correct.

As a result, such models cannot be used to provide a patient with information regarding a medical treatment. For example, if a user asked for information regarding a psychotherapy treatment, the model may provide incorrect information (e.g. attributing a drawback of an alternative, medicinal treatment to the psychotherapy treatment) or irrelevant information (e.g. discussing a drawback of a medical treatment in the context of the medical treatment). Such models may also not be able to provide information (whether incorrect, irrelevant or otherwise) on new treatments. That is, there was no information regarding a treatment in the training data, the model may have no knowledge of the treatment or be able to recognise the treatment for what it is.

Such models also cannot be used to help a user diagnose a problem with a motor vehicle. For example, if a user provided information about a noise coming from the user's particular model of car in an attempt to diagnose a cause of the noise, the model may provide incorrect information (e.g. attributing a noise coming from a brake pad as being caused by a windscreen wiper) or irrelevant information (e.g. providing information relating to a different model of car or a different type of vehicle).

There are many other applications in which such language models are inappropriate for use due to the potential of the information provided being false.

To increase the accuracy with which a language model provides information, it is possible to limit the corpus of training data (that is used to train the language model with) to a specific area. However, doing so may limit the amount of training data available and thus reduce the reliability of the language model after training. Models trained in this way may also be limited to a specific area for which they been trained and separate models may be required for each specific area. Thus, to provide answers to user queries in a first and a second area, a first and a second language model must each be provided to the user. In order for each language model to be provided to the user in this way, each language model must first be trained, stored ready for use and transmitted to the user.

Accordingly, using language models in any of these ways may correspond to a user being provided with unreliable data (in particular, when a single, generic language model is used) or data being transmitted and stored inefficiently (in particular, when multiple, specific language models are used).

It is an object of the present invention to mitigate or resolve one or more problems associated with the prior art.

SUMMARY

In an example described herein there is a computer-implemented method for generating a dialogue system output, comprising: receiving, at an input, input data relating to a speech or text input signal originating from a user device; receiving, at one or more processors, a plurality of domain snippets, wherein each domain snippet comprises data representing reference data and data representing an associated prompt; processing, by the one or more processors, the plurality of domain snippets to determine a plurality of similarity indicators, each similarity indicator indicating a similarity between the input data and a respective domain snippet; processing, by the one or more processors, the plurality of similarity indicators to select one or more of the data representing reference data; providing, by the one or more processors, data representing the input data and the one or more data representing reference data as an input to an input layer of a neural network configured to generate a dialogue system output by: identifying at least a portion of reference data of the one or more data representing reference data for use by at least one layer of the neural network to generate a response to the input data; processing the portion of reference data to generate a dialogue system output; and outputting, by an output layer of the neural network, the dialogue system output; and outputting, by an output of a dialogue system, the dialogue system output.

Beneficially, by providing the one or more data representing reference data to the neural network, the dialogue system output generated by the neural network may provide an accurate response to the input data. Put difference, the dialogue system output may be more accurate than if determined otherwise.

The input data may comprise one or more questions and/or one or more answers. The questions may be provided by a user to the dialogue system. The answers may have been provided as outputs by the dialogue system. For example, the user may have asked a first question and the input data may comprise the first question. As an alternative example, the user may have asked a first question, the dialogue system may have provided a first response in response to the first question and the user may have asked a second question. The input data may comprise the first question, the first response and the second question. The data representing the input data may be the input data itself. The data representing the input data may be an embedding of the input data.

The data representing reference data may be the reference data itself. The data representing the associated prompt may be the associated prompt itself. In other words, each domain snippet may comprise the reference data and the associated prompt. Additionally or alternatively, the data representing the reference data may comprise an embedding of the reference data and/or the data representing the associated prompt may comprise an embedding of the associated prompt. For example, each domain snippet may comprise an embedding of the reference data and an embedding of the associated prompt. The data representing the reference data and the data representing the associated prompt may comprise a combined embedding of the reference data and the associated prompt.

As a first example, the method may provide accurate medical information to a user. For example, the input data may comprise a user question from a user relating to a medical treatment. Each of the reference data may comprise medical information and the associated prompt may be example questions to which the reference data would provide an answer. The one or more domain snippets may be domain snippets that comprise medical information relevant to the user question and/or that comprise an example question that is similar to the user question. The neural network may use the at least a portion of reference data to determine a dialogue system output that provides an answer to the user question using the medical information provided by the one or more domain snippets.

As a second example, the method may provide accurate mechanical information to a user. For example, the input data may comprise a user question from a user relating to a problem with a vehicle. Each of the reference data may comprise mechanical information and the associated prompt may be example questions to which the reference data would provide an answer. The one or more domain snippets may be domain snippets that comprise mechanical information relevant to the user question and/or that comprise an example question that is similar to the user question. The neural network may use the at least a portion of reference data to determine a dialogue system output that provides an answer to the user question using the mechanical information provided by the one or more domain snippets.

As a third example, the method may provide accurate financial information to a user. For example, the input data may comprise a user question from a user relating to a financial information. Each of the reference data may comprise financial information and the associated prompt may be example questions to which the reference data would provide an answer. The one or more domain snippets may be domain snippets that comprise financial information relevant to the user question and/or that comprise an example question that is similar to the user question. The neural network may use the at least a portion of reference data to determine a dialogue system output that provides an answer to the user question using the financial information provided by the one or more domain snippets.

The associated prompt may be an example question corresponding to the reference data. For example, each domain snippet may comprise data representing reference data and data representing a corresponding example question. The corresponding example question may be an example question for which the reference data would be relevant.

Receiving a plurality of domain snippets may comprise receiving, from digital storage, a plurality of domain snippets.

The method may further comprise embedding, by the one or more processors, the input data to determine an embedding of the input data. Providing the data representing the input data may comprise providing the embedding of the input data.

Providing the data representing the input data as an input to the neural network may comprise providing, the embedding of the input data, as an input to the neural network. Accordingly, providing the data representing the input data and the one or more domain snippets to the input layer of the neural network may comprise providing the embedding of the input data and, for each domain snippet, the embedding of the reference data and the embedding of the associated prompt.

Processing the plurality of domain snippets to determine the plurality of similarity indicators may comprise determining, for each domain snippet, a similarity indicator between the data representing the input data and the data representing the reference data of the domain snippet. For example, determining a similarity indicator may comprise determining a similarity of respective embeddings. In other words, determining a similar indicator may comprise determining a similarity indicator between an embedding of the input data and an embedding of the reference data. The similarity indicator may be, for example, the cosine similarity. Processing the plurality of similarity indicators to select one or more of the plurality of domain snippets may comprise identifying domain snippets that are more similar to the input data. For example, a number of domain snippets with cosine similarities that are more similar to the input data than the rest of the domain snippets. In some examples, the domain snippet most similar to the input data may be selected. In other examples, three or five domain snippets that are more similar to the input data than the rest of the domain snippets.

Processing the plurality of domain snippets to determine the plurality of similarity indicators may comprise determining, for each domain snippet, a similarity indicator between the data representing the input data and the data representing the associated prompt of the domain snippet. Determining a similar indicator between the input data and the data representing the associated prompt may comprise determining a similarity indicator between an embedding of the input data and an embedding of the associated prompt.

The method may further comprise: merging, by the one or more processors, the data representing the input data and the one or more data representing reference data to provide a merged neural network input data; and wherein providing the data representing the input data and the one or more data representing reference data as the input to the input layer of the neural network comprises: providing, by the one or more processors, the merged neural network input data as an input to the input layer of the neural network. In some examples, merging the data representing the input data and the one or more data representing reference data may comprise merging the input data and one or more reference data. In other examples, merging the data representing the input data and the one or more data representing reference data may comprise merging the embedding of the input data and one or more embeddings of the references data. Merging may comprise, for example, concatenation.

The method may further comprise: processing, by the one or more processors, the input data to determine a topic; and providing, by the one or more processors, data representing the topic as an input to the input layer of the neural network.

The data representing the topic may be the topic itself. The data representing the topic may be an embedding of the topic.

Merging the input data and the one or more domain snippets to provide a merged neural network input may further comprise merging, by the one or more processors, the input data, the one or more data representing reference data, and the data representing the topic to provide the merged neural network input data.

In a second example described herein there is a system for generating a dialogue system output comprising: an input configured to receive input data relating to a speech or text input signal originating from a user device; one or more processors configured to: receive a plurality of domain snippets, wherein each domain snippet comprises data representing reference data and data representing an associated prompt; process the plurality of domain snippets to determine a plurality of similarity indicators, each similarity indicator indicating a similarity between the input data and a respective domain snippet; process the plurality of similarity indicators to select one or more of the data representing reference data; provide data representing the input data and the one or more data representing reference data as an input to an input layer of a neural network configured to generate a dialogue system output by; identifying at least a portion of reference data of the one or more data representing reference data for use by at least one layer of the neural network to generate a response to the input data; processing the portion of reference data to generate a dialogue system output; and outputting, by an output layer of the neural network, the dialogue system output; and an output of a dialogue system configured to output the dialogue system output.

LIST OF FIGURES

The present invention will be described, by way of example only, with reference to the accompanying drawings, in which.

DETAILED DESCRIPTION

Referring to FIGS. 1 to 9, the details of one or more aspects of methods, systems and a computer software product for generating a dialogue system output will now be described in more detail below. The use of the same reference numbers in different instances in the description and the figures may indicate like elements.

Figure 1:
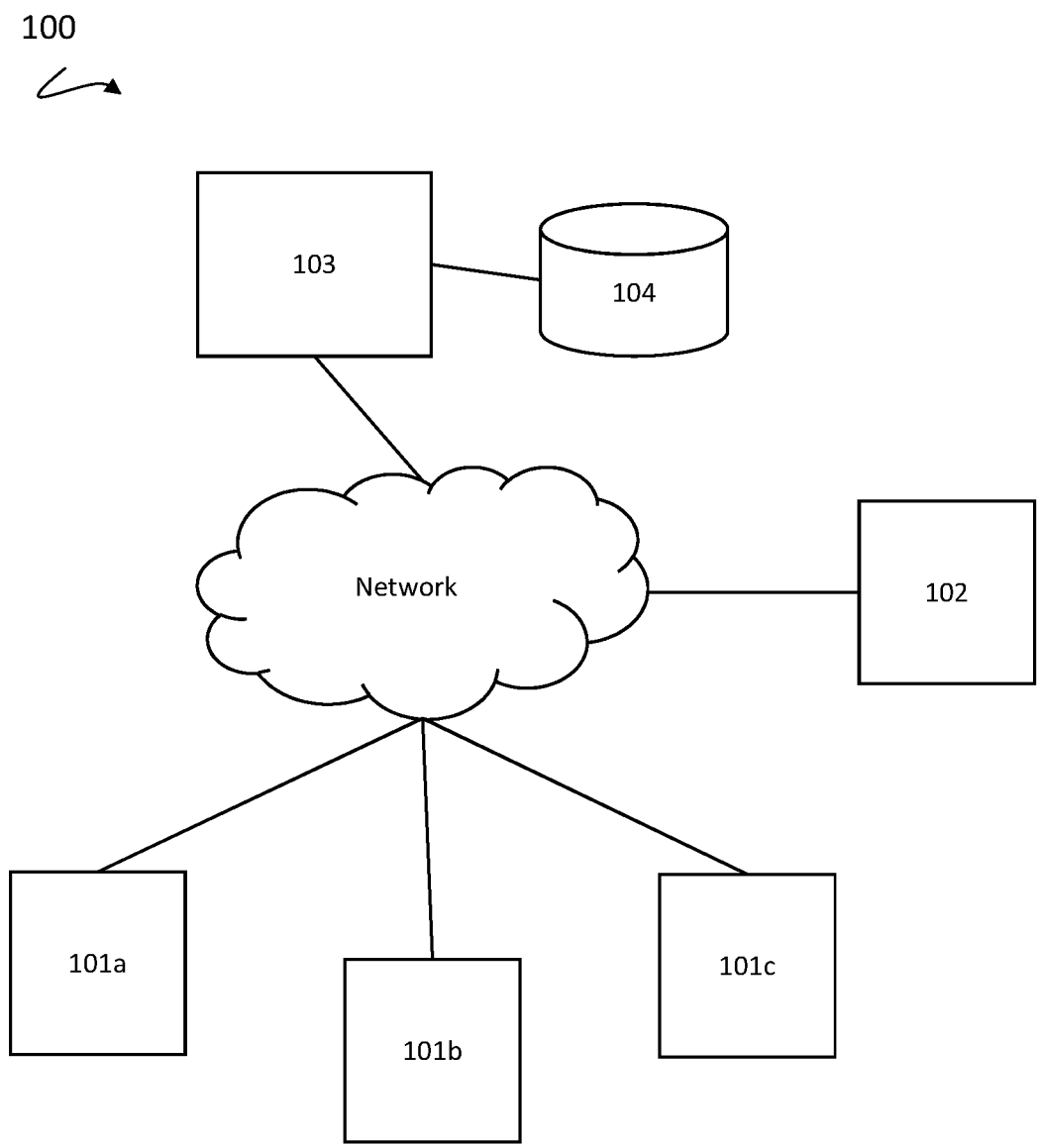
FIG. 1 shows a schematic illustration of a system suitable for implementing one or more embodiments.

Referring to FIG. 1a, there is shown a computer system 100 suitable for implementing parts of the methods described herein. In the system 100, user devices 101a-c (collectively referred to as user devices 101) are configured to communicate over a network with a server 103. The server has access to storage 104. For example, the storage 104 may be local to the server 103 (as depicted in FIG. 1) or may be remote. While the storage is depicted as a single storage 104, it will be appreciated that the storage 104 may be distributed across a plurality of devices and/or locations. The server 103 is configured to make available, over the network, one or more applications for use by user devices 101. In particular, the server 103 is configured to make available a dialogue system. The dialogue system (which may be, e.g., a chatbot) receives inputs from the user and processes the inputs to generate appropriate outputs. The dialogue system may be accessed by a user device 101 through, for example, a web-browser or a client application operating locally on the user device 101. The storage 104 may store data (e.g. in one or more databases) used by the application. For example, the storage 104 may store sets of questions to ask a user of the application and may store answers provided by the user in response to those questions. The storage 104 may further store machine-learning models used by the application to process users' answers. The storage 104 may further store individual profiles and credentials for respective users of the application so that a user's answers may be uniquely and securely identified with that user. The server 103 and/or the user devices 102 may be in further communication with one or more third party devices 102. The dialogue system may transmit, from a user device 101 or the server 103, information generated during use of the dialogue system to the one or more third party devices 102, or may automatically communicate with third party devices 102 to cause services to be scheduled or provided by third parties associated with the third party devices 102.

Each of the user devices 101 may be any device that is capable of accessing the application provided by the server 103. For example, the user devices may include a tablet computer, a desktop computer, a laptop, computer, a smartphone, a wearable device or a voice assistant.

The application provided by the server 103 provides an interface to output information to a user and to enable a user to input information. For example, the interface may include a textual interface in which the user inputs text (e.g. using a keyboard or handwriting recognition interface associated with the user device 101) and the application provides outputs in a text format (e.g. using a display associated with the user device 101). Alternatively or additionally, the interface may include an audio interface in which the user inputs audio (e.g. using a microphone associated with the user device 101) and the application provides outputs in an audio format (e.g. using a speaker associated with the user device 101). It will be appreciated that the interface may include a plurality of input/output modalities including text, audio, video, animation, etc. Additionally, it will be appreciated that inputs and outputs provided in a first format may be converted to a second format. For example, where the application provides an audio input interface, audio inputs provided by the user may be converted to a textual format by the application for further processing. Similarly, where the application provides an audio output interface, audio outputs may be generated by converting textual outputs to an audio format.

Figure 2:
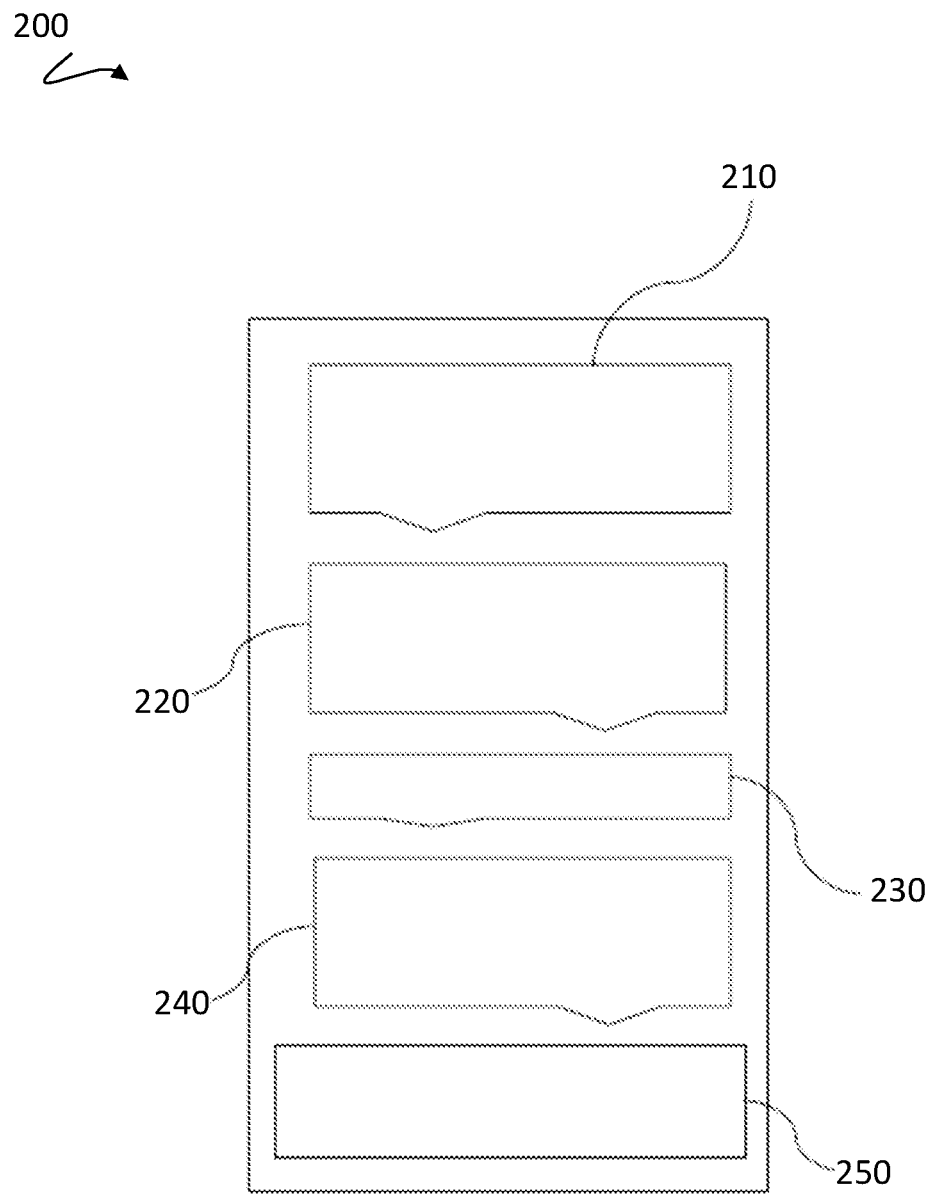
FIG. 2 shows an illustration of a dialogue system interface according to an example method described herein.

Referring to FIG. 2, there is shown an example user interface for the application provided by the server 103. In the example of FIG. 2, the user interface takes the form of a chat interface 200. The chat interface 200 is presented on a display associated with a user device 101.

In some examples, the user may present a first question to the chat interface 200. The first question may be in the form of free text, or may involve the selection of one or more options from a list of questions, or a combination of these. Based on the first question, the chat interface 200 can present an answer to the user. The user may provide one or more follow up questions and the chat interface may present one or more follow up answers in response.

In other examples, the chat interface 200 may present one or more initial questions 210 to a user, to which the user will submit a first response 220. This first response 220 may be in the form of free text, or may involve the selection of one or more options from a list of answers, or a combination of these. Based on the first response 220, the chat interface 200 can present one or more follow up questions 230 to the user, to which one or more further responses 240 can be provided by the user. The one or more follow up questions may be determined by a machine learning model processing the first response to determine a preliminary diagnosis. One or more rounds of questions and responses may be provided such that a machine learning model makes multiple, iterative preliminary diagnoses and elicits more information from the user before determining a final diagnosis.

Typically, when using a smartphone to display the chat interface 200, a text input area 250 such as a keyboard or handwriting recognition area of a screen will typically be present on the user interface.

It will be appreciated that user interfaces other than chat interfaces may be provided. The user interface provides a front-end of the application. Other components of the application include communication interfaces to enable communication with the user devices 101 and application logic configured to assist the user of a user device 101 in performing a diagnostic. For example, the application logic may include one or more machine-learning models configured (e.g. trained) to process input data provided by the user to generate one or more outputs that facilitate the user in performing the diagnostic.

Figure 3:
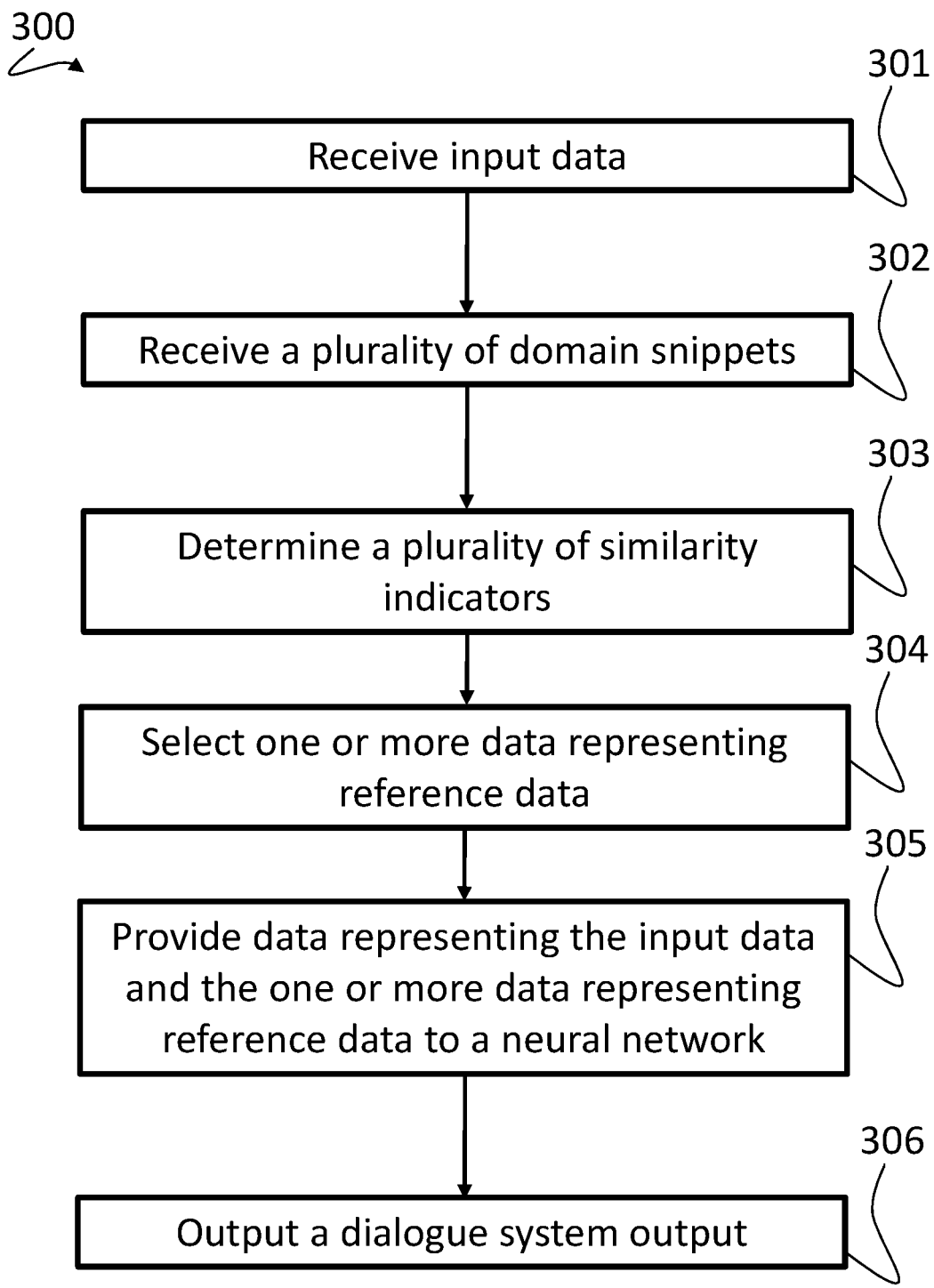
FIG. 3 shows a flow diagram depicting a computer-implemented method for generating a dialogue system output.

FIG. 3 shows a flow diagram depicting a computer-implemented method 300 for generating a dialogue system output. At step 301, input data is received. At step 302, a plurality of domain snippets is received. At step 303, a plurality of similarity indicators is determined. At step 304, one or more domain snippets are selected. At step 305, the input data and the one or more domain snippets are provided to a neural network. At step 306, a dialogue system output is output.

At step 301, input data is received. The input data may be received at an input. The input may be an input of a dialogue system. The input data may relate to a speech or text input signal. The input data may originate from a user device. The input data may comprise one or more questions and/or one or more answers. The questions may be provided by a user to the dialogue system. The answers may have been provided as outputs by the dialogue system. For example, the user may have asked a first question and the input data may comprise the first question. As an alternative example, the user may have asked a first question, the dialogue system may have provided a first response in response to the first question and the user may have asked a second question. In such an alternative example, the input data may comprise the first question, the first response and the second question. The input data may comprise other data. For example, the input data may comprise information provided by a therapist. Additionally or alternatively, the input data may comprise information provided by other applications used by the same user.

The method 300 may comprise determining, from the input data, data representing the input data. For example, the method 300 may comprise embedding, using an embedder, the input data to determine an embedding of the input data. The embedder may be a neural network. The neural network may be a transformer. As an example, the neural network may be pre-trained BERT-based language model. Embedding the input data may provide two large dimension vectors, for example, each vector may be a 768-dimension vector.

The dialogue system, the input data and/or the dialogue system output may relate to medical information. For example, the input data may be a query regarding a medical treatment and the dialogue system output may medical information providing an answer to the query.

The information may be financial information. For example, financial information may inform a user regarding investments.

The information may be mechanical information. For example, mechanical information may allow a user to identify (i.e. diagnose) a fault with a car.

The method 300 may comprise use of a topic. In some examples, the topic may be fixed for the dialogue system. In other words, the dialogue system may be configured to provide a dialogue system output relating to a particular topic. In other examples, the method 300 may comprise determining a topic from the input data. For example, the user may select a topic through a user interface and the input data may comprise the selected topic. Alternatively or additionally, the topic may be identified from the input data. For example, the input data may be provided to a neural network configured to identify a topic. As a further alternatively, the topic may be identified by a second user prior to the user being provided with access to the dialogue system.

At step 302, a plurality of domain snippets is received. The plurality of domain snippets may be received at one or more processors. Each domain snippet may comprise reference data and an associated prompt. More generally, each domain snippet may comprise data representing the reference data and data representing the associated prompt. The associated prompt may be one of a plurality of associated prompts. In other words, the domain snippet may comprise a plurality of associated prompts or data representing a plurality of associated prompts. The data representing reference data may be the reference data itself. The data representing the associated prompt may be the associated prompt itself. In other words, each domain snippet may comprise the reference data and the associated prompt. Additionally or alternatively, the data representing the reference data may comprise an embedding of the reference data and/or the data representing the associated prompt may comprise an embedding of the associated prompt. For example, each domain snippet may comprise an embedding of the reference data and an embedding of the associated prompt. Alternatively, each domain snippet may comprise an embedding, the embedding being an embedding of the reference data and the associated prompt. In other words, the data representing the reference data and the data representing the associated prompt may be a joint embedding of the reference data and the associated prompt. In examples in which domain snippets comprise an embedding of reference data and/or the associated prompt, the embedding may have been determined during a training process (i.e. the method 800 described below). Alternatively, the method 300 may comprise receiving and embedding the reference data and/or the associated prompt. Each domain snippet may be, or may have been, embedded using the same neural network as is used to embed the input data. Put differently, in examples in which a pre-trained BERT-based language model is used to embed the input data, the same pre-trained BERT-based language model may be used to embed each domain snippet.

Each associated prompt may be an example question corresponding to the reference data. The example question may be an example question for which the reference data of the same domain snippet would be relevant. Each associated prompt may have been determined previously during a training process. For example, each associated prompt may be a manual annotation or an automatic annotation of the corresponding reference data.

The plurality of domain snippets may be received at step 302 from digital storage. For example, the digital storage may comprise a collection of domain snippets.

The method 300 may further comprise applying a filter to the plurality of domain snippets. For example, the domain snippets may be filtered based on the topic and the domain snippets that are determined less relevant to the topic may be vetoed from further use. Such filtering may be carried out in a similar manner to the selection of the one or more domain snippets performed at step 304 and described below in more detail.

At step 303, a plurality of similarity indicators is determined. Each similarity indicator may indicate a similarity between the input data and a respective domain snippet. Put differently, for each domain snippet, a corresponding similarity indicator is determined that indicates the similarity between the domain snippet and the input data.

Determining a similarity indicator may comprise determining a similarity indicator between the data representing the input data and data representing the reference data of the domain snippet. For example, a cosine similarity may be determined between an embedding of the input data and an embedding of the reference data.

Additionally or alternatively, determining a similarity indicator may comprise determining a similarity indicator between the data representing the input data and the data representing the associated prompt of the domain snippet. For example, a cosine similarity may be determined between embedded input data and the embedded associated prompt. Put differently, in the example in which the input data comprises a user question and the associated prompt is an example question corresponding to the reference data, the user question and the example question may be compared to determine a similarity indicator. In examples in which each domain snippet comprises a plurality of associated prompts or data representing a plurality of associated prompts, a similarity indicator may be determined for each of the associated prompts. Accordingly, multiple similarity indicators may be determined for each domain snippet.

In examples in which multiple similarity indicators are determined for each domain snippet, a similarity indicator for the domain snippet may be determined as the similarity indicator of the multiple similarity indicators with the highest value. Put differently, each domain snippet (and the corresponding data representing reference data) may have an associated similarity indicator.

At step 304, one or more of the data representing reference data are selected. The data representing reference data may be selected by processing the plurality of similarity indicators. As described above, the plurality of similarity indicators may have been determined by comparing the data representing the input data to data representing reference data and/or to data representing associated prompts.

The data representing reference data may be selected by processing the plurality of similarity indicators to identify the data representing reference data most similar to the input data. In other words, if the similarity indicator is a cosine similarity, the data representing reference data corresponding to the highest cosine similarity (i.e. closest to 1) may be selected. Any appropriate number of data representing reference data may be identified. For example, five instances of data representing reference data may be identified as most similar to the input data. In other words, data representing reference data from five domain snippets may be identified.

Additionally or alternatively, a threshold test may be used to select or veto data representing reference data. For example, a cosine similarity may be required to be above 0.3 to allow the corresponding data representing reference data to be selected. As an alternatively, data representing reference data with a cosine similarity below 0.1 may be vetoed and not selected. Data representing reference data may be vetoed in this way, regardless of the similarity indicators of other data representing reference data. Put differently, if no data representing reference data have a cosine similarity above 0.1 (or another threshold value), no data representing reference data may be selected. As another example, all data representing reference data with a corresponding cosine similarity of above 0.9 may be selected. A threshold value (i.e. a value used in a threshold test) may be determined by a training process. The threshold value may be set as a percentile of a distribution of similarity indicators.

At step 305, data representing the input data and the one or more data representing reference data are provided to a neural network. The neural network may be configured to generate a dialogue system output. The neural network is discussed in more detail below in relation to the method 400. The data provided as input to an input layer of the neural network may be referred to as neural network input data.

The neural network input data may comprise data representing the input data. For example, the neural network input data may comprise the input data itself or the embedding of the input data. The neural network input data may comprise the one or more data representing reference data (i.e. the data representing reference data selected at step 304). The neural network input data may further comprise data representing the topic. Put differently, the neural network may be provided with the input data, the one or more data representing reference data and, optionally, the topic.

The neural network input data may comprise data that has been merged together. That is to say, the method 300 may comprise merging the data representing the input data and/or the one or more data representing reference data to provide merged neural network input data. In examples in which a topic is determined, the topic may also be merged with the data representing the input data and the one or more data representing reference data to provide the merged neural network input data. As an example, the embedding of the input data and one or more embeddings of reference data may be merged. Merging may comprise concatenation. In other words, merging the data representing the input data and the one or more data representing reference data may comprise concatenating the data representing the input data and the one or more data representing reference data.

Figure 4:
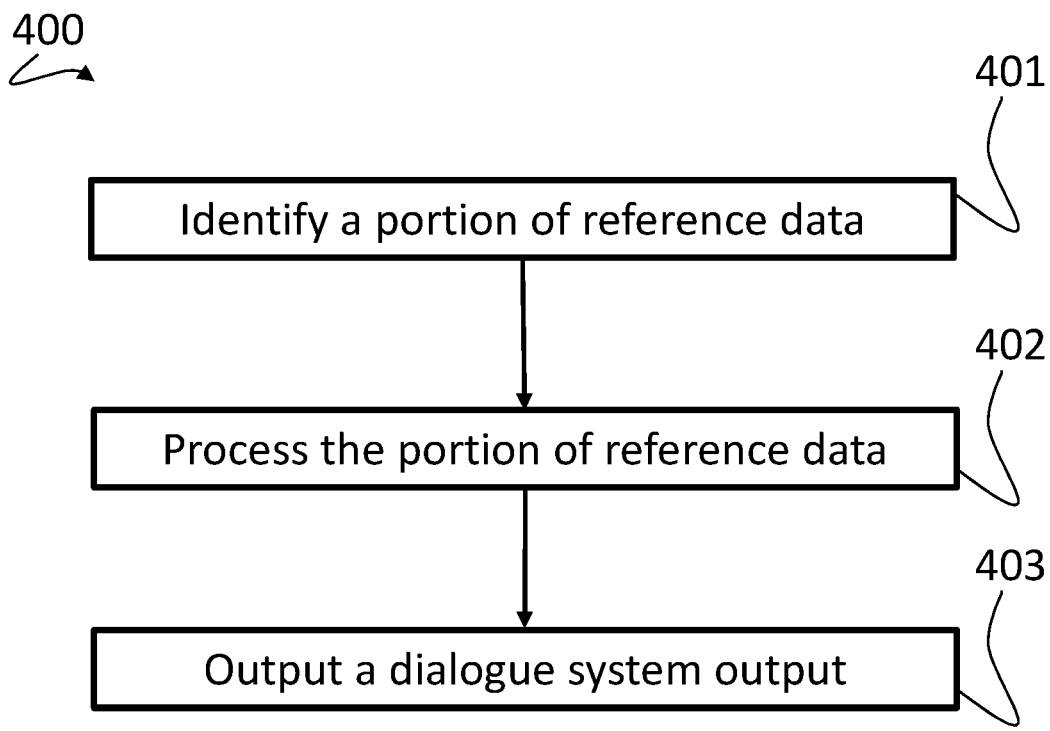
FIG. 4 shows a flow diagram depicting a method of generating a dialogue system output by a neural network.

FIG. 4 shows a flow diagram depicting a method 400 of generating a dialogue system output by a neural network. At step 401, a portion of reference data is identified. At step 402, the portion of reference data is processed. At step 403, a dialogue system output is output.

Put differently, after the neural network input data has been provided to the neural network at step 305, the neural network may carry out the method 400 of generating a dialogue system output. As mentioned above, the neural network input data may be provided as an input to an input layer of the neural network.

The neural network may be any neural network that is able to generate text output based on input text. Put differently, the neural network may be any language model e.g. a large language model. For example, the neural network may be the language model shown in FIG. 5 and discussed in more detail below. For example, the neural network may comprise a generative pre-trained transformer (GPT). The neural network may comprise a multi-layer transformer decoder.

Figure 5:
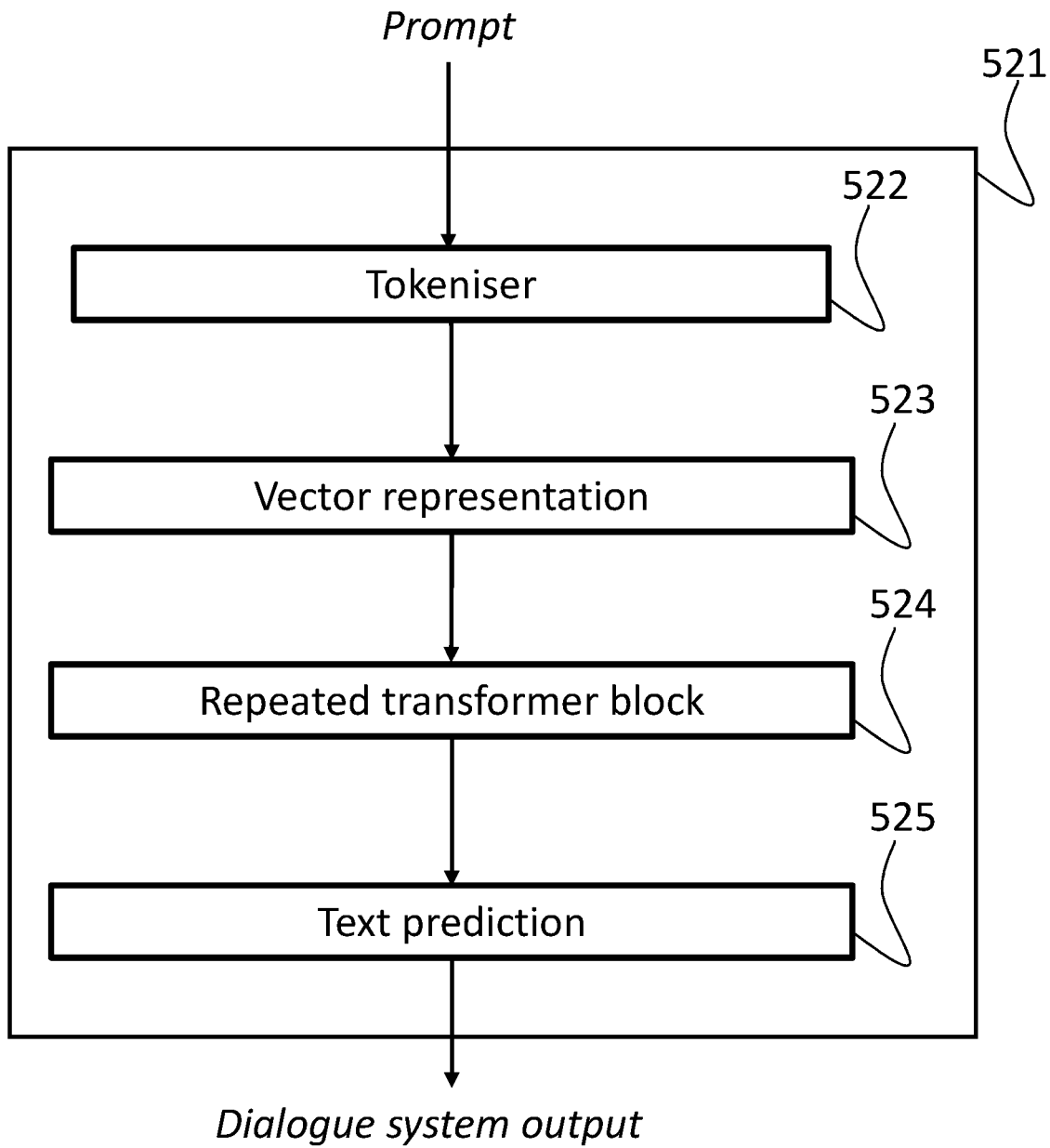
FIG. 5 is a schematic illustration of an example language model that may be used in the methods described herein.

FIG. 5 shows a schematic illustration of an example language model 521 that may be used in the methods 300, 400. In this example, the language model 521 comprises a transformer decoder. The language model 521 comprises a plurality of attention layers. Other types of language model may be used. For example, a language model based on a recurrent neural network may be used.

A system prompt is taken as input to a tokeniser 522. The tokeniser 522 takes the input text and outputs a sequence of tokens representing the text, from a vocabulary of possible tokens. Special tokens, such as tokens representing a start or end, may also be included in the vocabulary. Each token may be represented by a different positive integer number for example. The tokeniser 522 outputs a sequence of numbers corresponding to the input system prompt. The number of tokens in the sequence will vary between different input prompts.

The sequence of tokens is taken as input to a vector representation module 523. The vector representation module comprises stored token representations. Each token representation is a stored vector, where each vector corresponds to a token from the vocabulary. For each token in the input sequence of tokens, the corresponding token representation is retrieved.

The vector representation module may further comprise stored positional representations. For example, each positional representation may be a stored vector corresponding to an absolute position in the sequence of tokens.

For each token in the input sequence, addition of the token representation and the positional representation is performed, to produce a single vector corresponding to the token. This sequence of vectors is taken as input to a repeated set of transformer blocks 524. In particular, the sequence of vectors populates an input matrix, where each vector from the sequence populates a row (any remaining rows being populated with zero values).

Each transformer block comprises an attention module, followed by an addition and layer normalisation, a feed forward neural network and a second addition and layer normalisation. The attention module may be a self-attention module. The attention module may be a multi-headed attention module.

Each attention module comprises three stored matrices of weights. These are trainable parameters of the language model 521. In particular, each attention module comprises a key weight matrix, a query weight matrix and a value weight matrix. When the input matrix is taken as input to the first transformer block, a key matrix is calculated as the matrix product of the input matrix with the key weight matrix, a query matrix is calculated as the matrix product of the input matrix with the query weight matrix, and a value matrix is calculated as the matrix product of the input matrix with the value weight matrix. For a multi-headed attention layer, each of the query matrix, key matrix and value matrix is then split into separate matrices, one for each attention head, along the column dimension.

Scores are then calculated for each attention head. A matrix product is calculated between the query matrix and the transposed key matrix for each attention head. The scores represent, for the token being processed (the score matrix row), the attention of the model on each other token in the sequence (the score matrix columns). A higher score corresponds to more focus on the token.

An attention mask is then applied to the output score matrix for each attention head, to mask out the scores corresponding to future tokens. A softmax function is applied to the result, giving a final score matrix for each attention head. The matrix product of the score matrix with the value matrix is then taken for each attention head. The outputs from the attention heads are then merged. The matrix product with a stored projection matrix is taken, to give the output of the attention layer.

This output is taken as input to a first addition and layer normalisation module, in which an element wise addition is performed with the input matrix and a layer normalisation performed on the result. The feed forward neural network is then applied. Each row (corresponding to a token) from the output of the addition and layer normalisation module is taken as input separately to the neural network, so that a sequence of vectors is output from the neural network. A nonlinear activation is applied in the feed forward layer. The output from the neural network module is taken as input to the second addition and layer normalisation module, which performs an element-wise addition with the input to the feed forward neural network module, and then a layer normalisation. The output of the second addition and layer normalisation module is formed into an input matrix and taken into the next transformer block.

The language model 521 is run to predict the next word in a sequence of text. A vector comprising the values from the row corresponding to the last token in the input text in the final matrix output from the repeated transformer block 524 is thus taken as input to the text prediction module 525, in order to predict the next token in the sequence.

In the text prediction module 525, the matrix product of this vector with a matrix of the stored token representations is taken. The result corresponds to a score for each token in the vocabulary. A softmax function is applied to the output, to produce a vector of probability values, each value corresponding to a token in the vocabulary. This represents the probability that the next token in the sequence corresponds to each token in the vocabulary. The next token in the sequence is predicted based on the output probabilities. For example, the token having the highest probability may be selected, or a token may be sampled based on the probabilities.

The predicted token is then appended to the sequence of tokens corresponding to the input system prompt text, and the result is taken again as input to the language model 521, to predict the next token in the sequence. This process is repeated, until a pre-defined maximum number of tokens is reached, or until an end token is outputted. The tokens are then converted into the corresponding sequence of text—this is the dialogue system output.

The training of the neural network is discussed in more detail below in reference to step 803 of the method 800.

At step 401, a portion of reference data is identified. The portion of reference data may be identified for use to generate a response to the input data. The response may be generated by at least one layer of the neural network.

While the portion of reference data is referred to as a portion, this is merely exemplary. For example, the reference data in its entirely may be identified (and subsequently processed) by the neural network. Accordingly, the term at least a portion of reference data may be used.

In some examples, the portion of reference data may comprise data representing reference data from a single domain snippet. In other examples, the portion of reference data may comprise data representing reference data from multiple domain snippets.

At step 402, the portion of reference data is processed. The portion of reference data may be processed to generate a dialogue system output. In some examples, the output may comprise a URL to a webpage comprising relevant information.

At step 403, a dialogue system output is output. The dialogue system output may be output by an output layer of the neural network.

The dialogue system output may comprise directions to a user. The directions may direct the use to perform a method to mitigate a condition.

Referring again to FIG. 3, at step 306, a dialogue system output is output. The dialogue system output may be output by an output of a dialogue system. The dialogue system output may be output at an appropriate time. For example, the dialogue system output may be output immediately. Alternatively, a first portion of the dialogue system output may be output a first time (i.e. immediately) and a second portion of the dialogue system output may be output at a second, later time. The second time may be determined by the dialogue system at, or prior to the first time. In this way, the dialogue system may schedule additional the output of additional dialogue system output.

The method 300 may further comprise determining a knowledge indicator of a first user's knowledge about the topic. For example, the input data may be compared to the associated prompts corresponding to the selected one or more data representing reference data and a knowledge indicator may be determined. For example, the knowledge indicator may comprise the respective similarity indicators. Additionally or alternatively, the knowledge indicator may comprise a portion corresponding to the dialogue system output. In other words, the method use knowledge indicated based on a similarity indicator to indicate the initial knowledge of the first user and then the knowledge indicator may be adjusted to reflected the change in knowledge of the first user due to the dialogue system output. The knowledge indicator may be provided to a second user to inform the second user of the first user's knowledge about the topic.

The method 300 may further comprise providing a summary of the input data and/or the dialogue system output. The summary may be provided to a second user.

The method 300 may be used in with a chat interface, for example, the chat interface 200 to receive user input and/or output the dialogue system output.

In a first example, the information may relate to a medical treatment. Additionally or alternatively, the information may relate to a medical condition. While a medical treatment will be discussed in relation to the first example, it will be appreciated that the information may relate to any medical information. The user may ask a question regarding a medical treatment using the chat interface. At step 301, input data comprising the question may be received. At step 302, a plurality of domain snippets may be received. The reference data in each domain snippet may comprise medical information. The associated prompt in each domain snippet may comprise an example question that corresponds to the medical information in the domain snippet. At step 303, a plurality of similarity indicators may be determined. Each similarity indicator may be a cosine similarity indicating the similarity between the example question and the question asked by the user (i.e. the question in the input data). As an alternative, each similarity indicator may be a cosine similarity indicating the similarity between the medical information and the question asked by the user. At step 304, one or more reference data may be selected. Five reference data may be selected based on the similarity indicators. At step 305, the user question and the five reference data may be provided to the neural network configured to determine dialogue system output. The dialogue system output may be determined by the neural network as a response to the user question providing a relevant, factually correct answer. Additionally or alternatively, the dialogue system output may comprise a URL to a website containing information relevant to the question. For example, the URL may direct the user to a webpage with relevant medical information. At step 306, the response (i.e. the dialogue system output) is output by the chat interface 200.

In the first example, the knowledge indicator may be provided to a therapist. The knowledge indicator may indicate, to the therapist, the user's knowledge of the medical treatment. Additionally or alternatively, the therapist may be provided with a summary. The summary may comprise the questions the user has provided as input to the chat interface and/or the dialogue system output that has been provided to the user. Accordingly, the therapist may be able to provide the user with relevant information in future.

In the first example, the system may provide the user with directions to mitigate the medical condition or apply a medical treatment. For example, the system may direct the user to carry out a relaxation technique in response to a user providing input relating to poor sleep. The relaxation technique may be scheduled to be provided at an appropriate time. For example, the directions may be provided at a time when the user is expected to be going to sleep.

Beneficially, as the dialogue system output is generated by processing of the portion of reference data, the dialogue system output may contain or correspond to the portion of reference data. Accordingly, the dialogue system output may, for example, provide factually correct information based on the portion of reference data.

As the neural network is provided with the data representing the input data and the one or more data representing reference data, the neural network may not process all available reference data to generate the dialogue system output. Accordingly, data may be transmitted more efficiently.

As the neural network may be provided with different reference data to generate different dialogue system outputs, the same neural network may be used to provide dialogue system outputs relating to different areas of knowledge. In other words, to generate a dialogue system output relating to a different area of knowledge, the neural network may only be provided with a different set of domain snippets. Accordingly, the method 300 allows for more efficient transmission of data.

As each domain snippet comprises data representing reference data and data representing an associated prompt, the associated prompt may allow the neural network to generate a more relevant dialogue system output.

As discussed below in more detail, as the neural network may trained on a large corpus of training data, the neural network may be better trained than if the training data had been restricted to a specific area.

Figure 6:
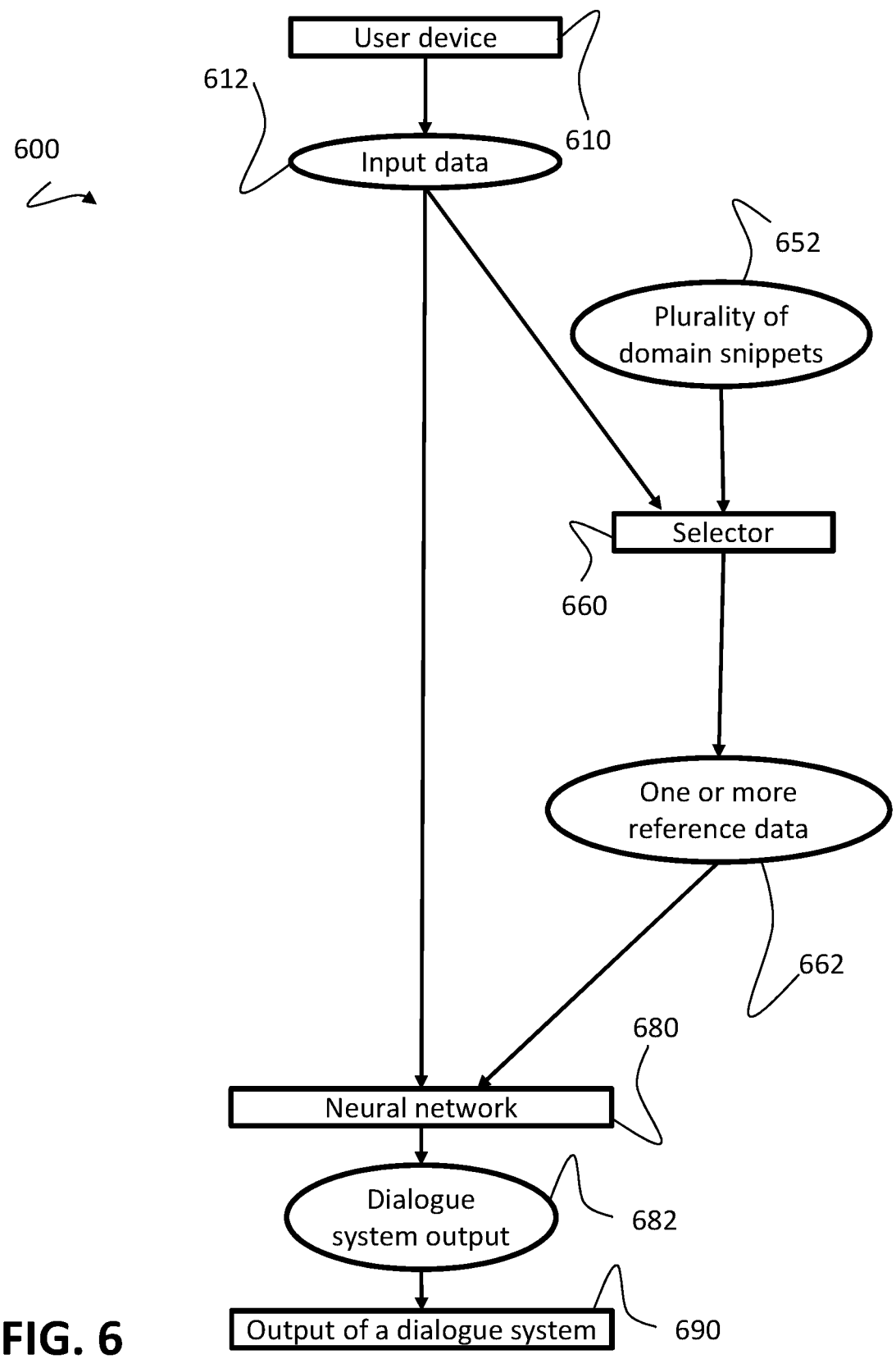
FIG. 6 shows a flow diagram of a first example data flow corresponding to the method for generating a dialogue system output.

FIG. 6 shows a flow diagram of a first example data flow 600 corresponding to the method for generating a dialogue system output. In FIG. 6 (and FIG. 7, discussed below) entities, for example, a user device 610, are shown in a rectangle and data, for example, input data 612, are shown in an ellipse. Functions of each of the entities may be carried out by one or more processors.

As shown in FIG. 6, a user device 610 receives input data 612. The input data is provided to a selector 660. The selector 660 also receives a plurality of domain snippets 652. The selector 660 determines a plurality of similarity indicators each similarity indicator indicating a similarity between the input data 612 and a respective domain snippet. The selector 660 then selects one or more reference data 662. The input data 612 and the one or more reference data 662 are provided to the neural network 680. The neural network 680 generates a dialogue system output 682. The dialogue system output 682 is output by a dialogue system 690.

Figure 7:
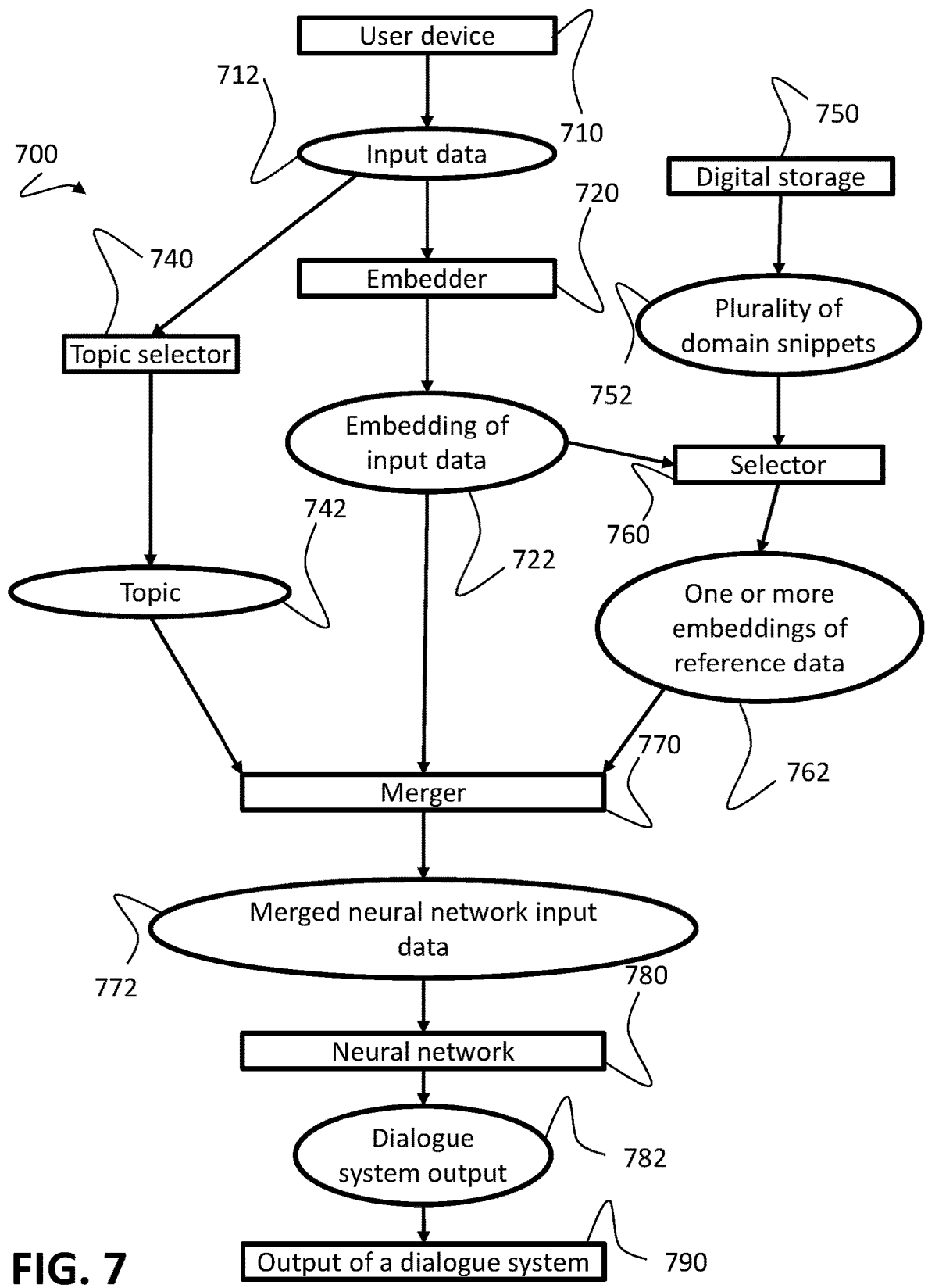
FIG. 7 shows a flow diagram of a second example data flow corresponding to the method for generating a dialogue system output.

FIG. 7 shows a flow diagram of a second example data flow 700 corresponding to the method for generating a dialogue system output.

As shown in FIG. 7, a user device 710 receives input data 712. The input data is embedded by an embedder 720 to determine an embedding of the input data. The embedding of the input data 722 is received by a selector 760. The selector 760 also receives a plurality of domain snippets 752 from digital storage 750. Each of the domain snippets 752 comprises an embedding of reference data and an embedding of an associated prompt. The selector 760 determines a plurality of similarity indicators each similarity indicator indicating a similarity between the embedding of the input data and a respective domain snippet. The selector 760 then selects one or more embeddings of reference data 762.

The input data 712 is also provided to a topic selector 740. The topic selector 740 selects a topic 742 corresponding to the input data 712.

The embedding of the input data 722, the one or more embeddings of reference data 762, and the topic 742 are merged by the merger 770 to form merged neural network input data 772. The merged neural network input data 772 is provided to the neural network 780. The neural network 780 generates a dialogue system output 782. The dialogue system output 782 is output by a dialogue system 790.

Figure 8:
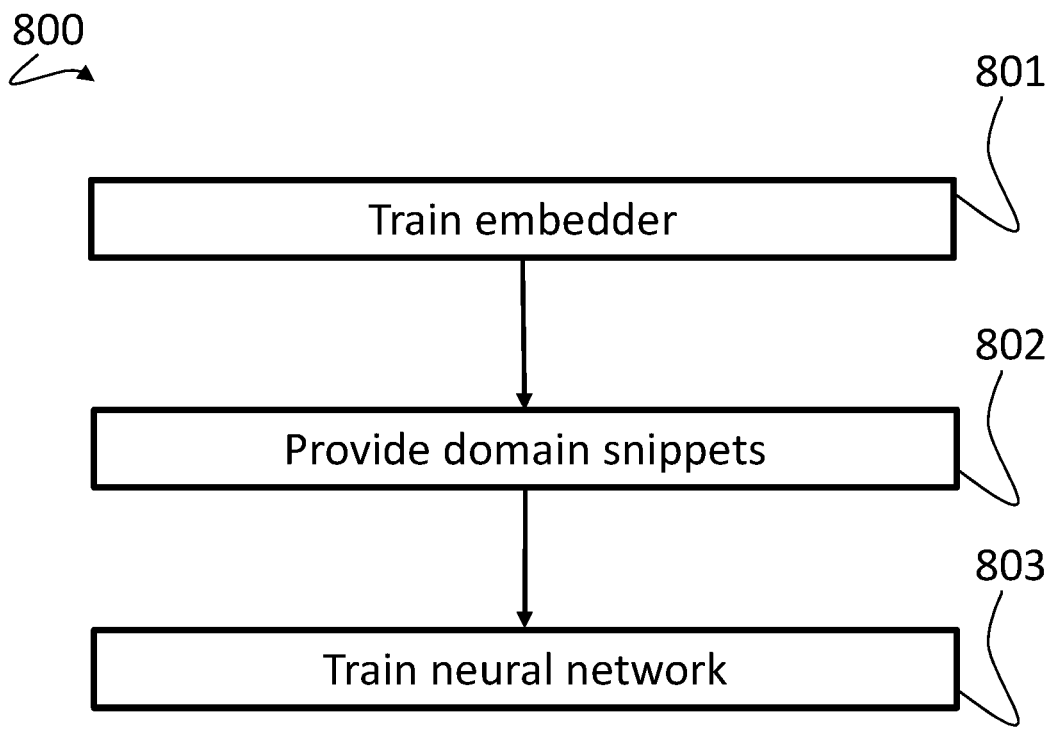
FIG. 8 shows an example method of training a dialogue system for use with the method of FIGS. 3 and 4.

FIG. 8 shows an example method 800 of training a dialogue system for use with the methods 300, 400. At step 801, an embedder is trained. At step 802, domain snippets are provided. At step 803, a neural network is trained.

At step 801, an embedder is trained. As discussed above, the embedder may be neural network. The embedder may be a transformer. Training an embedder may comprise fine-tuning an embedder.

At step 802, domain snippets are provided. Providing domain snippets may comprise receiving a plurality of reference data. Providing domain snippets may further comprise determine an associated prompt for each one of the plurality of reference data.

Determining associated prompts may comprise manual annotations and/or automatic annotations. Providing domain snippets may further comprise, for each domain snippet, determining data representing the reference data and/or data representing the associated prompt. For example, the reference data and/or the associated prompt may be embedded. The domain snippets may be stored, for example, in the digital storage 750.

At step 803, a neural network is trained. The neural network may be the neural network that performs the method 400 to generated a dialogue system output. The neural network may have been pre-trained. That is, the neural network may have carried out unsupervised learning using a corpus of unlabelled text.

Additionally or alternatively, the neural network may be trained using supervised learning. Such supervised learning may be referred to as supervised fine-tuning. Supervised fine-tuning may update weights of the neural network, for example, by training on a large number of labelled text specific to a task.

The supervised learning may comprise providing the neural network with example input data and target output data. For example, the example input data may be an example input that is expected to be provided to a dialogue system. The neural network may also be provided with one or more domain snippets. The one or more domain snippets may be the same domain snippets that would be selected at step 304 for the example input data. The target output data may be an ideal output that the dialogue system should output. For example, the example input data may be a user question and the target output data may be an answer to the user question. Supervised fine-tuning may comprise providing the neural network with the example input data to obtain an output corresponding to the example input data.

The output corresponding to the example input data may be compared to the target output data using a loss function. The loss function may be a cross-entropy loss function. Back propagation may be used to update weights of the neural network based on the gradient of the loss function. Additionally or alternatively, the output corresponding to the example input data may be compared to the target output data by a user. In other words, fine-tuning of the neural network may comprise use of reinforcement learning from human feedback (RLHF). For example, a user may rank outputs provided by the neural network to form a ranking and the ranking may be used to update weights of the neural network.

Figure 9:
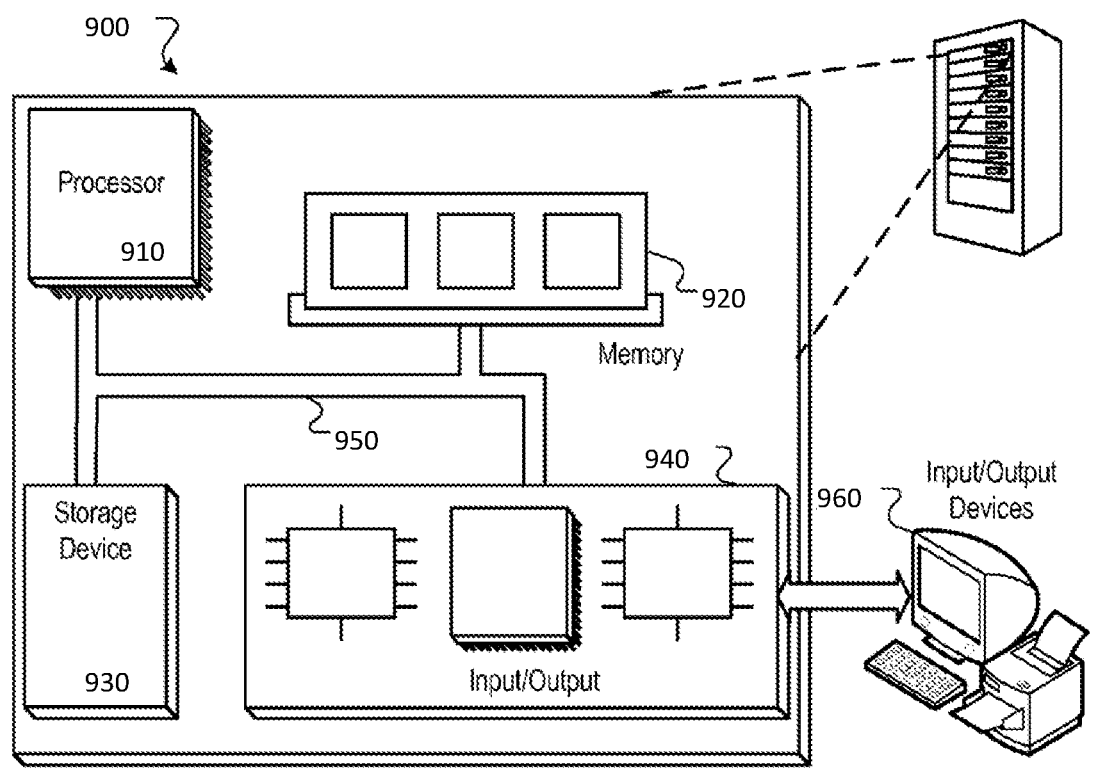
FIG. 9 shows an example computer system.

FIG. 9 shows an example computer system 900. The computer-implemented method 100 may be implemented on a computer system, such as the computer system 900. The computer system 900 may comprise a central processing unit 910, memory 920, one or more storage devices 930, an input/output processor 940, circuitry to connect the components 950 and one or more input/output devices 960.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a track-ball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for generating a dialogue system output, comprising:
   receiving, at an input, input data relating to a speech or text input signal originating from a user device;
   receiving, at one or more processors, a plurality of domain snippets, wherein each domain snippet comprises data representing reference data and data representing an associated prompt;
   processing, by the one or more processors, the plurality of domain snippets to determine a plurality of similarity indicators, each similarity indicator indicating a similarity between the input data and a respective domain snippet;
   processing, by the one or more processors, the plurality of similarity indicators to select one or more of the data representing reference data;
   providing, by the one or more processors, data representing the input data and the one or more data representing reference data as an input to an input layer of a neural network configured to generate a dialogue system output by:
      identifying at least a portion of reference data of the one or more data representing reference data for use by at least one layer of the neural network to generate a response to the input data;
      processing the portion of reference data to generate a dialogue system output; and
      outputting, by an output layer of the neural network, the dialogue system output; and
   outputting, by an output of a dialogue system, the dialogue system output.

2. The method of claim 1 wherein the associated prompt is an example question corresponding to the reference data.

3. The method of claim 1 wherein receiving a plurality of domain snippets comprises:
   receiving, from digital storage, a plurality of domain snippets.

4. The method of claim 1 further comprising:
   embedding, by the one or more processors, the input data to determine an embedding of the input data.

5. The method of claim 4 wherein providing the data representing the input data as an input to the neural network comprises:
   providing, the embedding of the input data, as an input to the neural network.

6. The method of claim 5 wherein processing the plurality of domain snippets to determine the plurality of similarity indicators comprises:
   determining, for each domain snippet, a similarity indicator between the data representing the input data and the data representing the reference data of the domain snippet.

7. The method of claim 5 wherein processing the plurality of domain snippets to determine the plurality of similarity indicators comprises:
   determining, for each domain snippet, a similarity indicator between the data representing the input data and the data representing the associated prompt of the domain snippet.

8. The method of claim 1 further comprising:
   merging, by the one or more processors, the data representing the input data and the one or more data representing reference data to provide a merged neural network input data; and
   wherein providing the data representing the input data and the one or more data representing reference data as the input to the input layer of the neural network comprises:
      providing, by the one or more processors, the merged neural network input data as an input to the input layer of the neural network.

9. The method of claim 8 further comprising:
   processing, by the one or more processors, the input data to determine a topic; and
   providing, by the one or more processors, data representing the topic as an input to the input layer of the neural network.

10. The method of claim 9 wherein merging the input data and the one or more domain snippets to provide a merged neural network input further comprises:
   merging, by the one or more processors, the input data, the one or more data representing reference data, and the data representing the topic to provide the merged neural network input data.

11. A system for generating a dialogue system output comprising:
- an input configured to receive input data relating to a speech or text input signal originating from a user device;
- one or more processors configured to:
  - receive a plurality of domain snippets, wherein each domain snippet comprises data representing reference data and data representing an associated prompt;
  - process the plurality of domain snippets to determine a plurality of similarity indicators, each similarity indicator indicating a similarity between the input data and a respective domain snippet;
  - process the plurality of similarity indicators to select one or more of the data representing reference data;
  - provide data representing the input data and the one or more data representing reference data as an input to an input layer of a neural network configured to generate a dialogue system output by;
    - identifying at least a portion of reference data of the one or more data representing reference data for use by at least one layer of the neural network to generate a response to the input data;
    - processing the portion of reference data to generate a dialogue system output; and
    - outputting, by an output layer of the neural network, the dialogue system output; and
- an output of a dialogue system configured to output the dialogue system output.

* * * * *